United States Patent [19]

Holmes

[11] 4,167,872
[45] Sep. 18, 1979

[54] DATA COLLECTION AND REDUCTION SYSTEM FOR A SHOCK SUPPRESSOR VALVE TEST SYSTEM

[75] Inventor: Lloyd H. Holmes, Salt Lake City, Utah

[73] Assignee: E-Systems, Inc., Dallas, Tex.

[21] Appl. No.: 914,228

[22] Filed: Jun. 9, 1978

[51] Int. Cl.$^2$ .............................................. G01F 1/66
[52] U.S. Cl. ................................................ 73/194 E
[58] Field of Search .............. 73/168, 194 E, 194 EM; 324/119; 363/125-126

[56] References Cited

U.S. PATENT DOCUMENTS 3,950,989  4/1976  Meirowitz ..................... 73/194 E X Primary Examiner—Charles Gorenstein
Attorney, Agent, or Firm—Robert V. Wilder

[57] ABSTRACT

A data collection and reduction system for a shock suppressor valve test system is provided. The test system includes a flow meter for generating a DC voltage signal corresponding to the velocity of fluid flowing through the flow meter and a recorder for recording and outputting an AC voltage signal corresponding to the velocity of fluid flowing through the flow meter. The data collection and reduction system includes circuitry interconnected to the flow meter for amplifying the DC voltage signal generated by the flow meter to produce an amplified DC voltage signal. Circuitry converts the amplified DC voltage signal to an AC voltage signal for application to the recorder for recordation of the velocity of the fluid flowing through the flow meter. Circuitry is further provided and interconnected to the recorder for amplifying the AC voltage signal output by the recorder. The data collection and reduction system further includes circuitry for converting the recorder output amplified AC voltage signal to a DC voltage signal for application to a second recorder for subsequent analysis of the test data generated by the portable test system.

1 Claim, 8 Drawing Figures

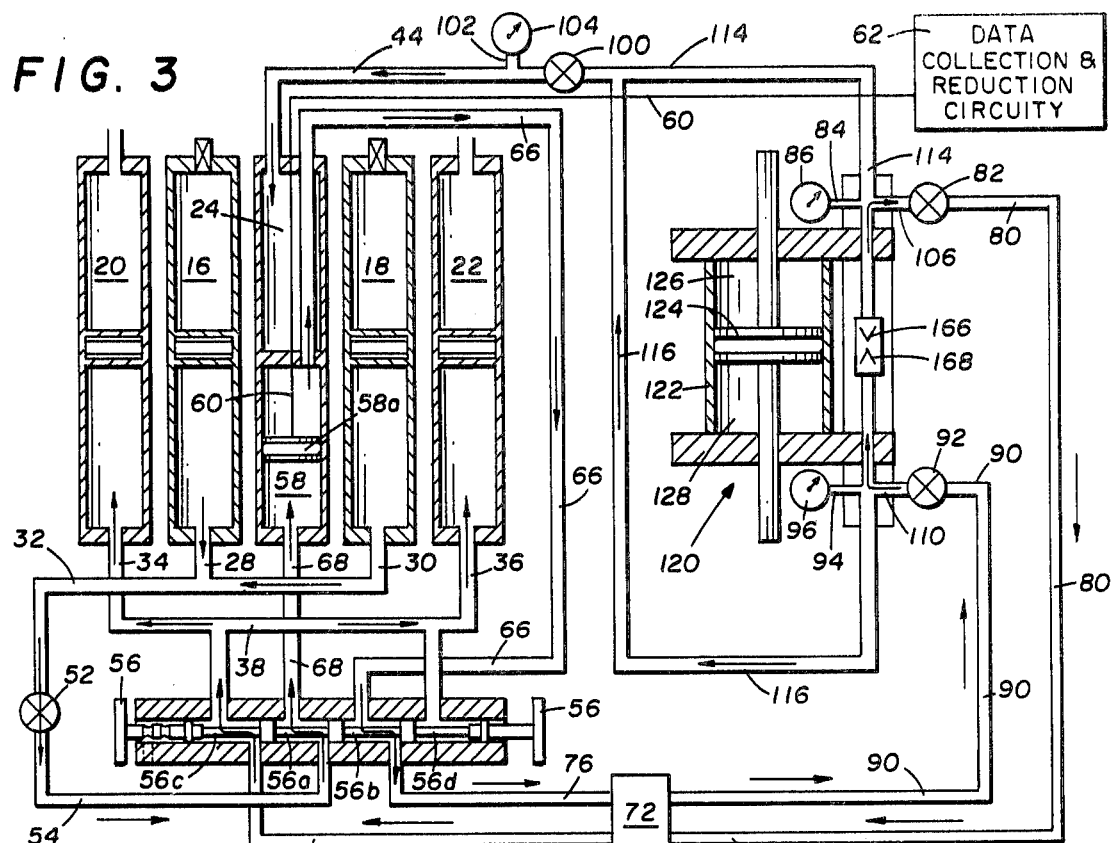
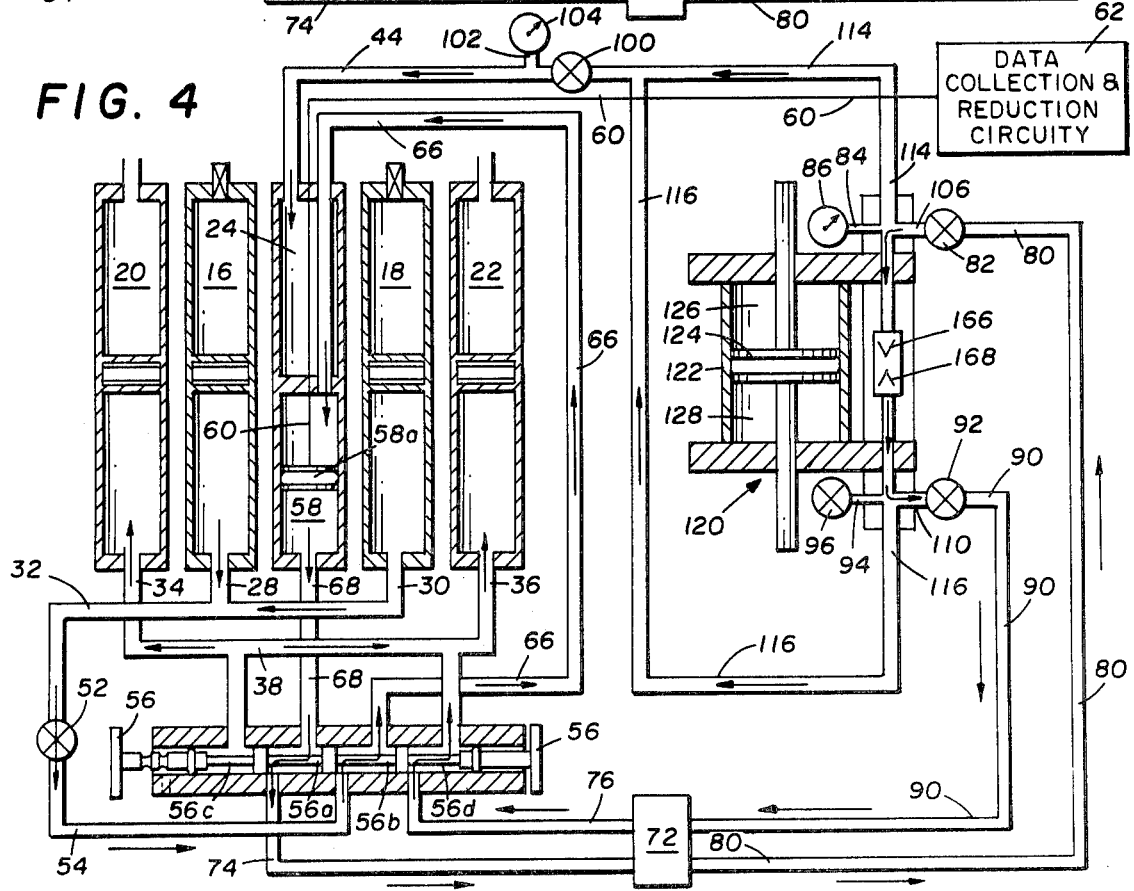

DATA COLLECTION AND REDUCTION SYSTEM FOR A SHOCK SUPPRESSOR VALVE TEST SYSTEM

FIELD OF THE INVENTION

This invention relates to test equipment, and more particularly to a data collection and reduction system for use with a portable test system for in line testing of the operating characteristics of shut-off valves of shock suppressors.

THE PRIOR ART

Shock suppressors including hydraulically operated shock suppressors or snubbers are typically utilized in power plants to maintain large pieces of equipment in place should there be a blowout or other explosive malfunction within the power plant system. To insure the proper operation of a snubber, periodic testing of the shut-off valves of the shock suppressor is required. This testing to insure proper closure of the snubber shut-off valves is a time consuming and periodic maintenance requirement within power plants.

Heretofore, the requirement of testing the shut-off valves of snubbers necessitated the removal of the snubber from its housing and mounting. The removal of the snubber from its in line operation required that portion of the power plant which utilized the snubber to remain out of service until testing of the snubber was completed. The amount of time the portion of the power plant was out of service created an intolerable situation in that the operation of the power plant was dictated by such things as servicing non-power related equipment.

In order to avoid removal of the snubber for testing purposes, various testing schemes have been utilized, such as extending fluid and vacuum lines from a remote testing station to the location of the snubber in the power plant. However, this method is cumbersome and the movement of heavy equipment to the shock suppressor location is extremely difficult. Such prior test equipment due to its size and weight was not possible to be brought to the actual operating location of snubbers.

A need has thus arisen for a portable test system for use with shock suppressors, such as hydraulic shock suppressors for in line testing of the shut-off valves associated with these shock suppressors. Such a testing system must be transportable to the site of a shock suppressor within a power plant system, such that the testing of the shut-off valves can be performed without removing the shock suppressor from its operating location. Such a testing system further must include a data collection and reduction system for collecting and compiling the test data for subsequent analysis.

SUMMARY OF THE INVENTION

In accordance with the present invention, a data collection and reduction system is provided for use with a test system for testing shock suppressors.

In accordance with the present invention a data collection and reduction system for a shock suppressor valve test system is provided. The test system includes a flow meter for generating a DC voltage signal corresponding to the velocity of fluid flowing through the flow meter and a recorder for recording and outputting an AC voltage signal corresponding to the velocity of fluid flowing through the flow meter. The data collection and reduction system includes circuitry interconnected to the flow meter for amplifying the DC voltage signal generated by the flow meter to produce an amplified DC voltage signal. Circuitry converts the amplified DC voltage signal to an AC voltage signal for application to the recorder for recordation of the velocity of the fluid flowing through the flow meter. Circuitry is further provided and interconnected to the recorder for amplifying the AC voltage signal output by the recorder. The data collection and reduction system further includes circuitry for converting the recorder output amplified AC voltage signal to a DC voltage signal for application to a second recorder for subsequent analysis of the test data generated by the portable test system.

DESCRIPTION OF THE DRAWINGS

A more complete understanding of the invention and its advantages will be apparent from the following detailed description taken in conjunction with the accompanying drawings in which:

FIGS. 3 and 4 are diagrammatic illustrations of the fluid flow pattern through the shock suppressor during testing;

DESCRIPTION OF THE PREFERRED EMBODIMENT

Figure 1:
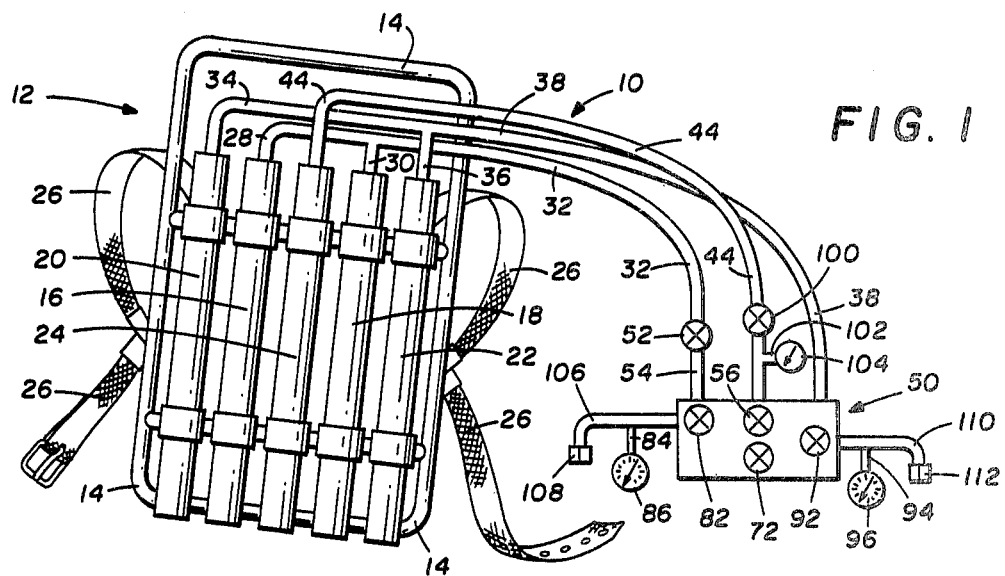
FIG. 1 is a perspective view of a shock suppressor testing system.

FIG. 1 illustrates a testing system utilized with the data collection and reduction system of the present invention and is generally identified by the numeral 10. The testing system 10 includes a backpack assembly generally identified by the numeral 12 to permit testing system 10 to be carried on the back of maintenance personnel to the operating location of a shock suppressor to be tested. Backpack 12 includes a frame 14 for mounting fluid canisters 16 and 18, return canisters 20 and 22 and a vacuum canister 24. Frame 14 may comprise, for example, lightweight aluminum tubing or other material to provide a structurally sound support frame that is lightweight to insure portability. Backpack assembly 12 further includes straps 26 for fastening backpack assembly 12 to the body of the workman.

Fluid canisters 16 and 18 contain clean, filtered and deaerated hydraulic fluid stored under pressure. Fluid canisters 16 and 18 may comprise, for example, barrier type accumulators that may be air or spring charged. Fluid canisters 16 and 18 are interconnected by fluid lines 28 and 30 to a main fluid line 32. Return canisters 20 and 22 are empty and may comprise, for example, barrier type accumulator canisters and are interconnected by fluid lines 34 and 36 to a main return line 38. Vacuum canister 24 is interconnected to a vacuum line 44.

Although two fluid canisters 16 and 18 and two return canisters 20 and 22 and one vacuum canister 24 have been illustrated alternatively, the number of canisters can be varied to accommodate the needed volume of fluid and vacuum necessary for the length of time the canisters can be used without recharging. Fluid canisters 16 and 18 are pressurized using nitrogen and are charged to approximately 400 psi fluid pressure.

Figure 2:
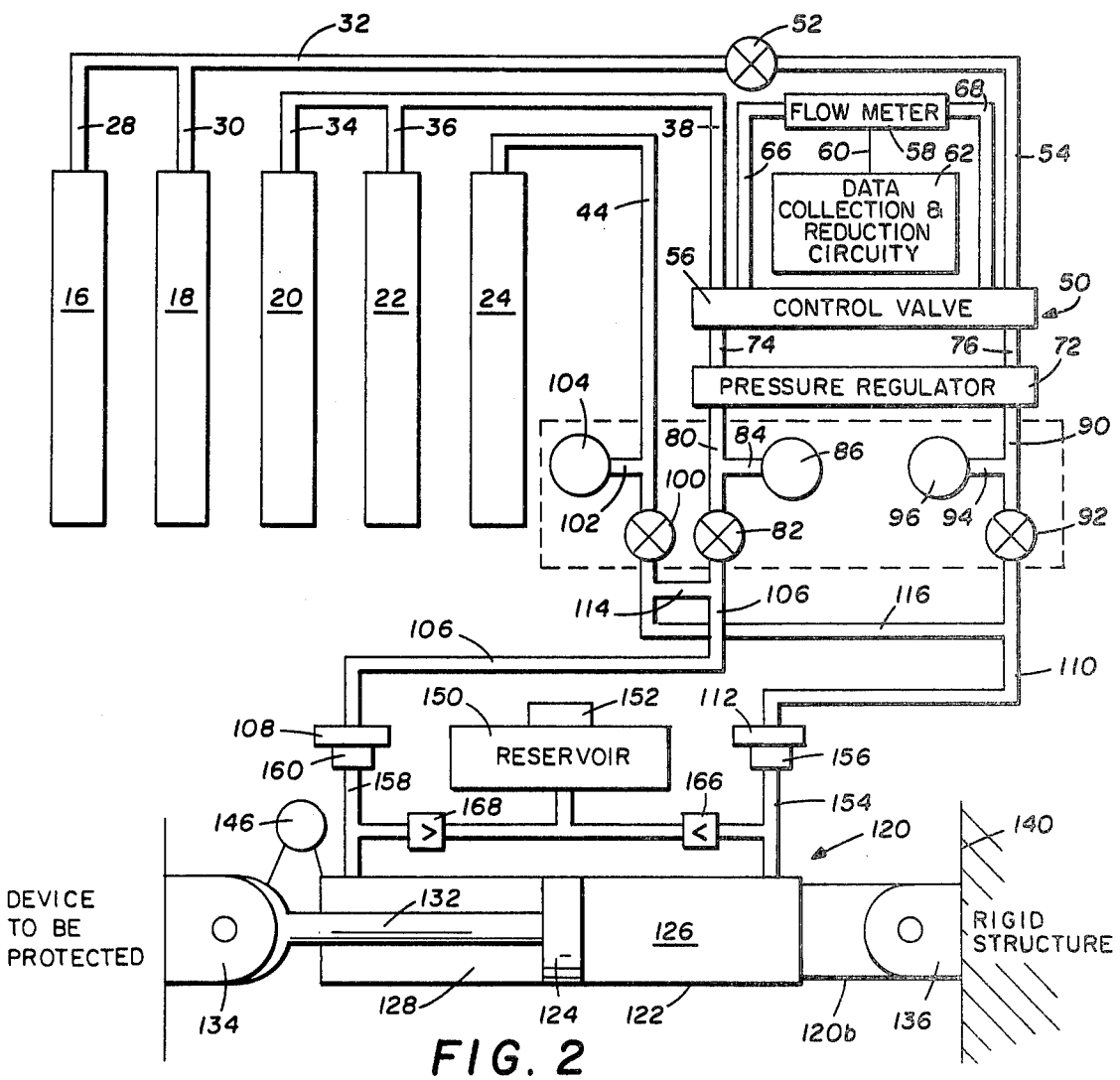
FIG. 2 is a block diagram of the testing system shown in FIG. 1 interconnected to a shock suppressor.

Referring simultaneously to FIGS. 1 and 2, wherein like numerals are utilized for like and corresponding elements, testing system 10 includes a valve assembly, generally identified by the numeral 50. Main fluid line 32 is interconnected through a needle valve 52 and a fluid line 54 to a control valve 56 contained within valve assembly 50. Main return line 38 is also interconnected to control valve 56 of valve assembly 50.

Figure 5:
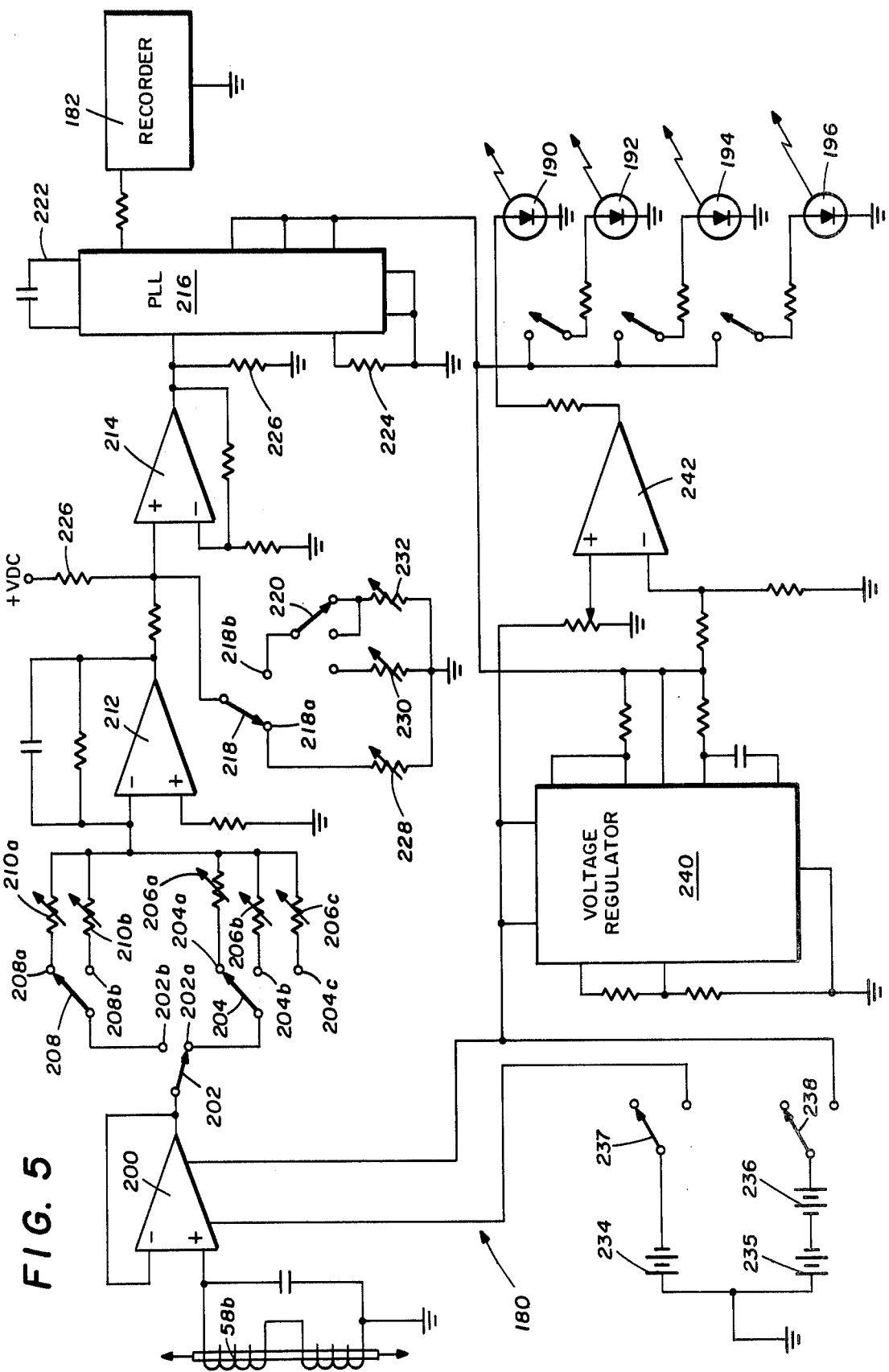
FIG. 5 is a schematic diagram of the data collection circuitry of the present invention for use with the testing system shown in FIG. 1.
Figure 6:
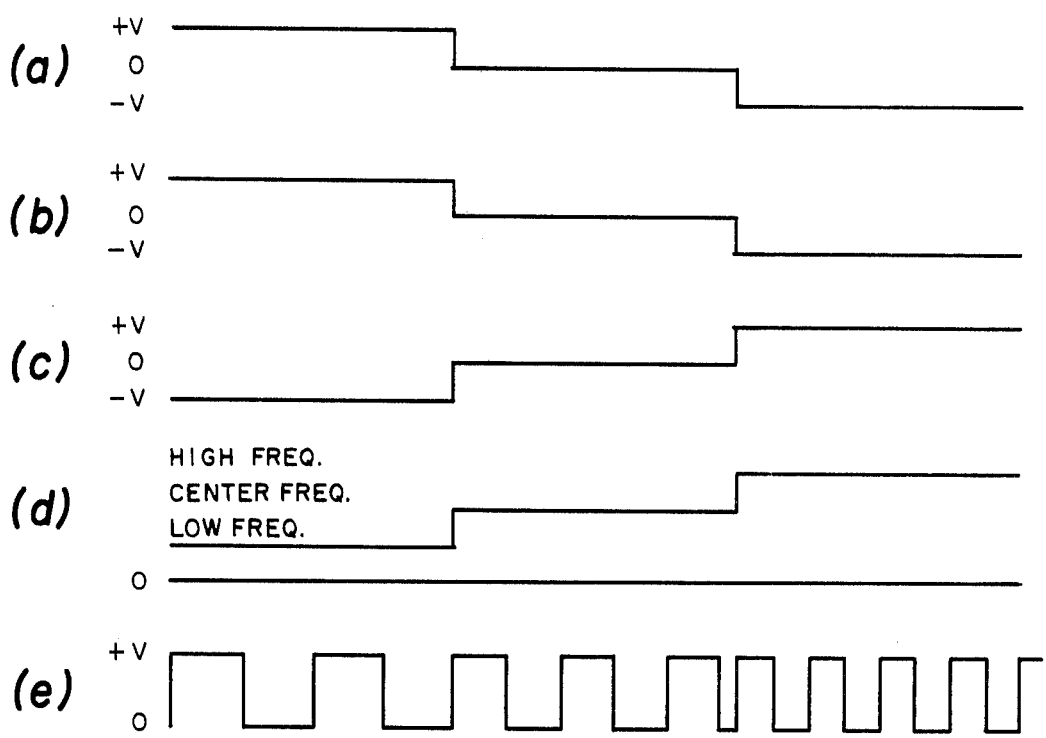
FIG. 6 is a representation of voltage signals taken at various points in the data collection circuitry illustrated in FIG. 5.
Figure 8:
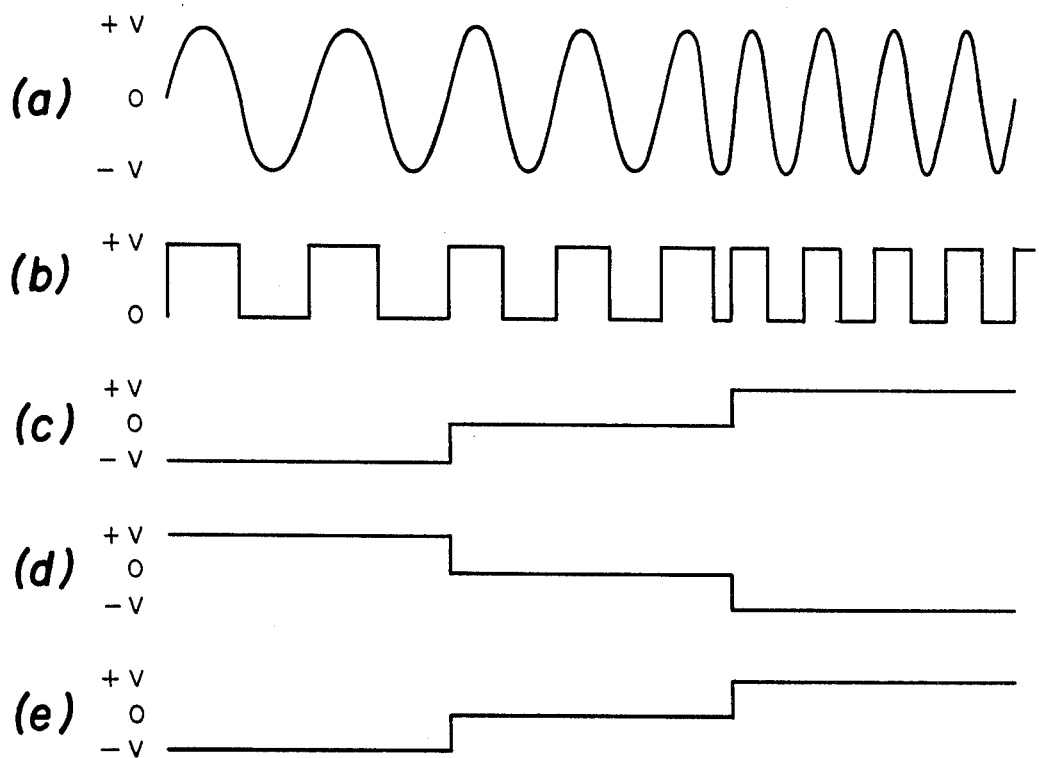
FIG. 8 is a representation of voltage signals taken at various points in the data reduction circuitry illustrated in FIG. 7.

Testing system 10 further includes a flow meter 58 whose operation will be subsequently described. Flow meter 58 is physically housed within vacuum canister 24 and includes a piston assembly 58a (FIG. 3) responsive to fluid flowing through flow meter 58 and a velocity transducer 58b (FIG. 5). Velocity transducer 58b generates an output voltage signal proportional to the velocity imparted to piston assembly 58a and represents the rate of flow of fluid flowing through flow meter 58. The output of velocity transducer 58b is applied along signal line 60 to data collection and reduction circuitry 62 of the present invention. Data collection and reduction circuitry 62 will be subsequently described in connection with FIGS. 5–8. Flow meter 58 is interconnected to control valve 56 through fluid lines 66 and 68. Control valve 56 is a manually operated valve and is interconnected to a pressure regulator valve 72 through fluid lines 74 and 76. Control valve 56 is operable between a first and second position. In the first position of control valve 56, control valve 56 connects fluid line 54 to fluid line 68, fluid line 66 to fluid line 76 and main return line 38 to fluid line 74. In the second position of control valve 56, control valve 56 connects fluid line 54 to fluid line 66, fluid line 68 to fluid line 74 and main return line 38 to fluid line 76. The operation of control valve 56 will be further described in connection with FIGS. 3 and 4.

Pressure regulator valve 72 is interconnected via a fluid line 80 to a shut-off valve 82 and via a fluid line 84 to a pressure gauge 86. Pressure regulator valve 72 is further interconnected via a fluid line 90 to a shut-off valve 92 and through a fluid line 94 to a pressure gauge 96.

Pressure regulator valve 72 allows fluid to flow from control valve 56 through fluid lines 74 and 80 to shut-off valve 82. However, when the fluid pressure in line 80 reaches a predetermined and established pressure, pressure regulator valve 72 is actuated and fluid pressure between fluid lines 74 and 80 is regulated. Similarly, fluid normally flows from control valve 56 through fluid line 76 and through pressure regulator valve 72 through fluid line 90 to shut-off valve 92. However, when a predetermined and established pressure is reached, pressure regulator valve 72 regulates the maximum pressure of fluid between control valve 56 and shut-off valve 92.

Vacuum canister 24 is interconnected by vacuum line 44 to a push-to-open valve 100 and by a vacuum line 102 to a vacuum gauge 104. Shut-off valve 82 is interconnected by a fluid line 106 to a valve assembly fitting 108. Similarly, shut-off valve 92 is interconnected by a fluid line 110 to a valve assembly fitting 112. Push-to-open valve 100 is interconnected to fluid lines 106 and 110 by vacuum lines 114 and 116.

FIG. 2 illustrates the interconnection of testing system 10 to a shock suppressor generally identified by the numeral 120. Shock suppressor 120 includes a main cylinder 122. A piston 124 is disposed within main cylinder 122 to define a retract cavity 126 and an extend cavity 128 of main cylinder 122. Piston 124 is interconnected through a piston rod 132 to a mounting structure 134 which is interconnected to a device within the power plant to be protected by shock suppressor 120 against an explosion, excessive vibration or other dislocating forces. End 120b of shock suppressor 120 is interconnected through a mounting structure 136 to a rigid structure 140 for mounting shock suppressor 120. Interconnected between piston rod 132 and shock suppressor 120 is a mechanical indicator 146 which measures the mechanical freedom of piston rod 132.

Shock suppressor 120 further includes a fluid reservoir 150. Fluid reservoir 150 includes a bleed and fill fitting 152 for servicing shock suppressor 120 to maintain the proper amount of reservoir fluid. Associated with retract cavity 126 of shock suppressor 120 is a port 154 having a port valve 156. Associated with extend cavity 128 of shock suppressor 120 is a port 158 having a port valve 160. Also included within main cylinder 122 are mutually opposing poppet valves 166 and 168 to permit a flow of hydraulic fluid through shock suppressor 120 due to movement of piston 124. In operation, testing system 10 is interconnected to shock suppressor 120 by connecting valve assembly fitting 108 of valve assembly 50 to port valve 160 of shock suppressor 120 and by connecting valve assembly fitting 112 of valve assembly 50 to port valve 156 of shock suppressor 120.

Referring simultaneously to FIGS. 2 and 3, the operation of testing system 10 will now be described. To test shock suppressor 120, valve assembly fittings 108 and 112 of valve assembly 50 are interconnected to port valves 160 and 156 of shock suppressor 120. Prior to operating port valves 156 and 160 of shock suppressor 120, fluid reservoir 150 is disabled and push-to-open valve 100 is pushed and held open until vacuum gauge 104 approaches its steady state pressure reading. The operation of push-to-open valve 100 and the disabling of fluid reservoir 150 functions to clear all air and any excess residual fluid from fluid lines 106 and 110, valve assembly fittings 108 and 112 and port valves 160 and 156. After fluid lines 106 and 110, valve assembly fittings 108 and 112 and port valves 160 and 156 have been evacuated, port valves 156 and 160 are actuated to hydraulically interconnect testing system 10 to shock suppressor 120. Shut-off valves 82 and 92 are actuated to begin testing.

FIG. 3 illustrates the first position of control valve 56. As previously stated, in this first position, main fluid line 32 is interconnected through a port valve 56a of control valve 56 to fluid line 68 to flow meter 58. Fluid flowing from flow meter 58 through fluid line 66 passes through a port valve 56b of control valve 56 to fluid line 76 to pressure regulator valve 72 for passage through shock suppressor 120. After testing of shock suppressor 120, fluid returns from pressure regulator valve 72 through port valve 56c of control valve 56 to main return line 38. The operation of needle valve 52 allows fluid to flow through fluid line 54 to flow meter 58 and via fluid lines 66, 76 and 90 to shut-off valve 92 into shock suppressor 120. Fluid then flows through mutually opposing poppet valves 168 and 166 into fluid line 106 to shut-off valve 82. Fluid passing through shut-off valve 82 returns via fluid lines 80 and 74 to port valve 56c of control valve 56 to main return line 38 into return canisters 20 and 22.

The velocity of the fluid flowing through the above-described path is measured by flow meter 58 whose output is applied to the present data collection and reduction circuitry 62 over signal lines 60. The rate of fluid flow is then increased by the further opening of needle valve 52. This increased flow causes poppet valve 166 to close. This closure is evidenced by a sudden cessation of flow and is detected by flow meter 58. The rate of flow at which poppet valve 166 closes can be converted to an equivalent shock suppressor piston velocity as is well known in the art. The further opening of needle valve 52 will increase the pressure in retract cavity 126 of shock suppressor 120 and in fluid line 76 until pressure regulator valve 72 is actuated and the fluid pressure from fluid line 76 into fluid line 90 is regulated. With the regulation of fluid flow from fluid line 76 to fluid line 90, needle valve 52 is closed and the time duration required for the pressure in retract cavity 126 monitored by pressure gauge 96 to decay through a specific pressure interval provides a measure of the bleed rate of shock suppressor 120. At regulated pressure, the flow can be measured by flow meter 58 and the bleed rate determined by translating from a known pressure drop to pressure across piston 124 at a rated load. Further, as the pressure increases within extend cavity 126, indicator 146 (FIG. 2) monitors the movement of piston 124 to measure the mechanical freedom of piston rod 132.

FIG. 4 illustrates the second position of control valve 56 to reverse the fluid flow through flow meter 58 to pressurize the extend cavity 128 of shock suppressor 120. In the second position of control valve 56, fluid line 54 is interconnected through port valve 56b of control valve 56 to fluid line 66. Fluid exits from flow meter 58 through fluid line 68. Fluid line 68 is interconnected to fluid line 74 through port valve 56a of control valve 56. Fluid then flows from fluid line 74 through pressure regulator valve 72 into fluid line 80 to shut-off valve 82. Fluid returning from shock suppressor 120 through shut-off valve 92 returns to control valve 56 via fluid lines 90 and 76. Fluid line 76 is interconnected to main return line 38 through port valve 56d of control valve 56.

Fluid flowing from fluid canisters 16 and 18 to shock suppressor 120 and returning to return canisters 20 and 22 as described above with control valve 56 in the second position permits the pressurizing of extend cavity 128 of shock suppressor 120, such that poppet valves 166 and 168 are in the open position. As needle valve 52 is opened to increase the fluid flowing through flow meter 58, poppet valve 168 will close. The rate at which the fluid is flowing through flow meter 58 at the time poppet valve 168 closes is the creep rate of shock suppressor 120 and demonstrates the mechanical freedom of piston rod 132. In the second position of control valve 56 as illustrated in FIG. 4, the closure of shut-off valve 92 will permit introduction of hydraulic fluid into reservoir 150 of shock suppressor 120 by operating needle valve 52.

After completion of all tests utilizing testing system 10, shut-off valves 82 and 92 and port valves 156 and 160 are closed. Push-to-open valve 100 is then opened to clear fluid lines 106 and 110 and vacuum lines 114 and 116 of excess residual fluids. Valve assembly fittings 108 and 112 are then disconnected and the pressure of reservoir 150 is enabled to return shock suppressor 120 to its operating status. If necessary, fluid canisters 16 and 18 are recharged with clean, filtered and deaerated hydraulic fluid. Fluid canisters 16 and 18 are recharged by disconnecting fluid line 54 from needle valve 52. Return canisters 20 and 22 can be emptied of returned fluid by disconnecting fluid lines 34 and 36.

FIG. 5 is a schematic diagram of the present data collection circuitry associated with the data collection and reduction circuitry 62 (FIG. 2) of the present invention, and is generally identified by the numeral 180. Data collection circuitry 180 functions to collect and record the output of flow meter 58 (FIG. 2) during testing of a snubber for subsequent data reduction and analysis. The data reduction and analysis after testing converts the flow meter output to the tested shock suppressor lock-up rate and bleed rate.

Data collection circuitry 180 functions to convert a DC output signal generated by velocity transducer 58b to an AC level signal and to record this AC level signal on a recorder 182. Recorder 182 may comprise, for example, an audio tape recorder. Recorder 182 records the velocities on a magnetic tape, such that upon completion of the test of a snubber, recorder 182 can be input through the present data reduction circuit (FIG. 7) associated with data collection and reduction circuitry 62 of the present invention to a strip recorder to analyze the data. Data collection circuitry 180 also includes optical indicators 190, 192, 194 and 196. Indicator 190 indicates whether there is sufficient battery power available to data collection circuitry 180 for proper operation. Indicator 192 indicates the end of an upwardly directed stroke of flow meter piston assembly 58a. Indicator 194 indicates a downwardly directed stroke of flow meter piston assembly 58a. Indicator 196 provides an indication of whether there is sufficient fluid flowing through flow meter 58.

In operation of the present data collection circuitry 180, when the operator of testing system 10 arrives at the operating site of a snubber, he can record the position of the snubber, its condition and identifying data such as serial number, by speaking directly into a microphone connected to recorder 182. During testing, recorder 182 is interconnected to data collection circuitry 180 to record the velocity of fluid flowing through flow meter 58.

Referring to FIG. 5, the DC output signal from velocity transducer 58b is applied to a high impedence amplifier 200. Velocity transducer 58b may comprise, for example, a Schaevitz Linear Transducer, Model 7L6VTZ. As the piston assembly 58a (FIG. 3) translates as a result of fluid flowing through flow meter 58, velocity transducer 58b generates a DC signal illustrated in FIG. 6a. In the preferred embodiment, the output of velocity transducer 58b ranges between ±120 millivolts per inch per second of displacement of piston assembly 58a. Amplifier 200 may comprise, for example, a Model LM324 or Model LM124 I/C and has a unity voltage gain factor. The output of amplifier 200 is illustrated in FIG. 6b.

The output of amplifier 200 is applied to a switch 202 having contacts 202a and 202b. When switch 202 is positioned to engage contact 202a, as illustrated in FIG. 5, the output of amplifier 200 is applied to a switch 204 having contacts 204a, 204b and 204c. Contacts 204a, 204b and 204c are interconnected to resistors 206a, 206b and 206c, such that the positioning of switches 202 and 204 and the selection of the values for resistors 206a, 206b and 206c provide the capability of monitoring different flow rates of fluid flowing through flow meter 58. The positioning of switch 204 allows for monitoring high fluid flow rates through flow meter 58 which in the preferred embodiment, are ten inches per minute, twenty-five inches per minute and one hundred inches per minute. The positioning of switch 202 to engage contact 202b applies the output of amplifier 200 to a switch 208 having contacts 208a and 208b. Contacts 208a and 208b are interconnected to resistors 210a and 210b, such that the positioning of switches 202 and 208 allows for monitoring flow rates which in the preferred embodiment are five inches per minute and ten inches per minute.

The connection of switches 204 and 208 with their associated resistors 206 and 210 determine the amount of signal from amplifier 200 that is applied to an amplifier 212. Amplifier 212 may comprise, for example, a Model LM324 or Model LM124 Quad-Operational amplifier I/C and functions to amplify the output signal of amplifier 200. In the preferred embodiment this amplifier signal ranges from ±0.5 volts and is illustrated in FIG. 6c. The output of amplifier 212 is applied to an amplifier 214 which functions as a buffer between amplifier 212 and a phase-locked loop 216. Also interconnected to the input of amplifier 214 is a switch 218 having contacts 218a and 218b connected to a switch 220 having contacts 220a and 220b. The operation of switches 218 and 220 develops the proper bias for the center operating frequency of phase-locked loop 216.

The output of amplifier 214 is illustrated in FIG. 6d. In the preferred embodiment, the low frequency has a voltage of +1.95 volts, the center frequency has a voltage of +2.06 volts and the high frequency has a voltage of 2.17 volts. Phase-locked loop 216 may comprise, for example, a Model CD4046 I/C. Phase-locked loop 216 includes a voltage controlled oscillator whose center operating frequency is determined by capacitor 222, and resistor 224 in addition to resistors 226, 228, 230 and 232. In the preferred embodiment, the center operating frequency of the voltage controlled oscillator contained within phase-locked loop 216 is approximately 1200 Hz.

The gain of amplifier 212 determines the output frequency of phase-locked loop 216 which ranges from 800 Hz to 1600 Hz. The output of the voltage controlled oscillator contained within phase-locked loop 216 is a square wave and is illustrated in FIG. 6e. This output signal is applied to recorder 182. Recorder 182 may comprise, for example, Model MTC-10.

Data collection circuitry 180 further includes power supply sources 234, 235 and 236. The output of power supply source 234 is applied through a switch 237 to amplifier 200. The output of power supply sources 235 and 236 are applied through a switch 238 to a voltage regulator 240 to provide a regulated voltage supply source for phase-locked loop 216 and for biasing amplifiers 200, 212 and 214. The output of voltage regulator 240 is also applied to an amplifier 242 which functions as a zero crossing detector biased to turn off indicator 190 when the supply voltage generated by power supply sources 235 and 236 drops below a predetermined level. Amplifier 242 may comprise, for example, a Model LM324 or Model LM124 I/C.

Figure 7:
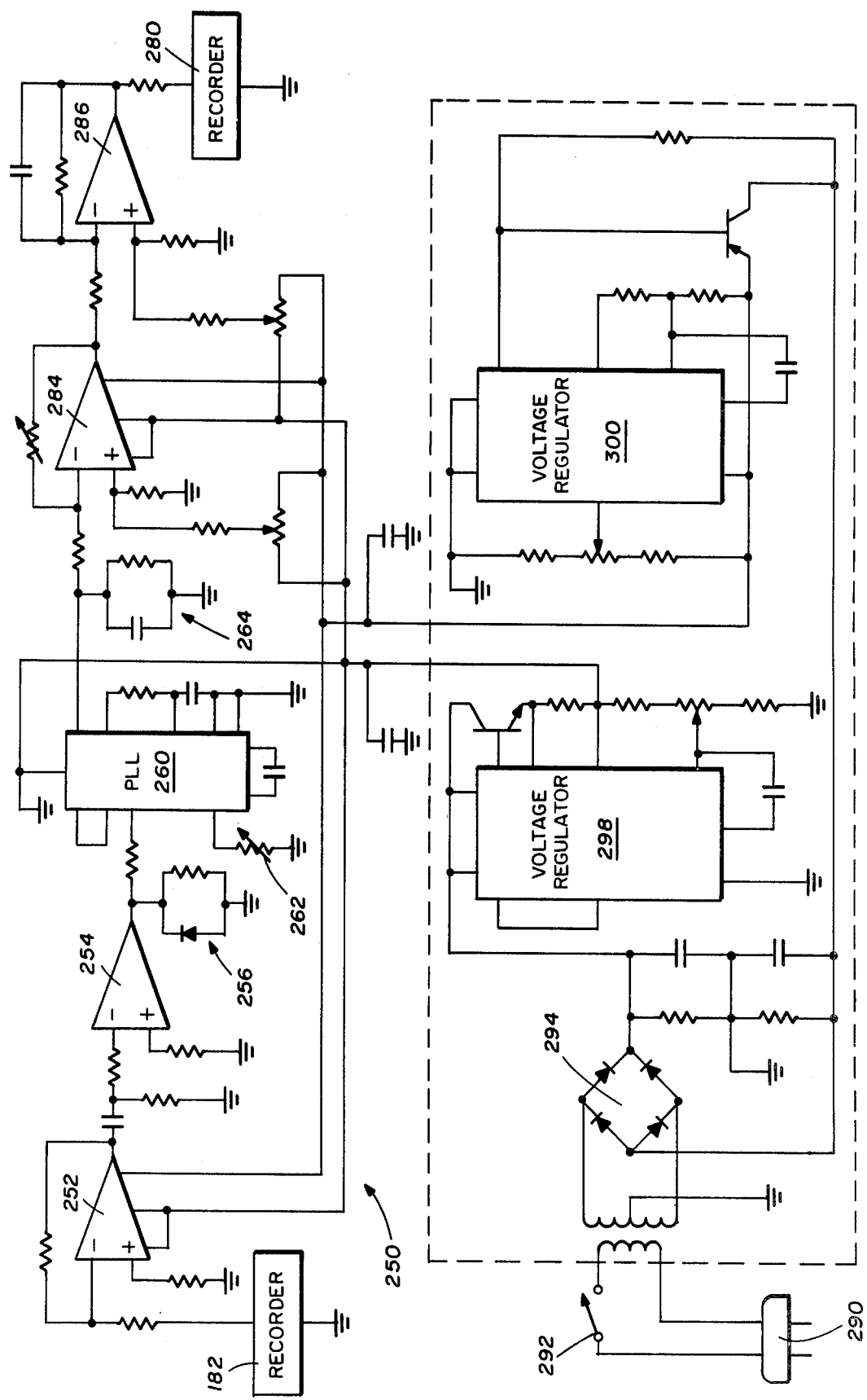
FIG. 7 is a schematic diagram of the data reduction circuitry of the present invention for use with the testing system shown in FIG. 1.

FIG. 7 illustrates the present data reduction circuitry generally identified by the numeral 250 of data collection and reduction circuitry 62 (FIG. 2) of the present invention. The output of recorder 182 (FIG. 5) is a sine wave signal varying, in the preferred embodiment, between 800 and 1600 Hz and is illustrated in FIG. 8a. The output of amplifier 252 is applied to an amplifier 254 which functions as a zero crossing detector to provide a square wave input to a phase-locked loop 260. The output of amplifier 254 is clipped using diode and resistor assembly 256 and is illustrated in FIG. 8b. Amplifiers 252 and 254 may comprise, for example, 747 I/Cs. Phase-locked loop 260 may comprise, for example, a CD4046 I/C and includes a voltage comparator and a voltage controlled oscillator. The center operating frequency of the voltage controlled oscillator contained within phase-locked loop 260 in the preferred embodiment is 1200 Hz and is controlled by variable resistor 262.

The output of phase-locked loop 260 is the resultant signal generated by the comparator within phase-locked loop 260 after a comparison is made between the input to phase-locked loop 260 and the signal generated by the voltage controlled oscillator and is illustrated in FIG. 8c. This demodulated output from phase-locked loop 260 is filtered using a filter network 264 and is applied to amplifiers 284 and 286. The output signals of amplifiers 284 and 286 are illustrated in FIGS. 8d and 8e. Amplifiers 284 and 286 may comprise, for example, 747 I/Cs. The output of amplifier 286 is applied to a recorder 280. Recorder 280 may comprise, for example, a strip recorder or an x-y recorder including a time base. From an analysis of the trace from strip recorder 280 the lock-up rates of the tested snubber can be determined.

Power is supplied to operational amplifiers 252, 254, 284 and 286 and phased-locked loop 260 from an AC supply source 290 through a switch 292 and voltage rectifier bridge 294. The output of voltage rectifier bridge 294 is supplied to the circuit components of data reduction circuitry 250 through DC voltage regulators 298 and 300. DC voltage regulators 298 and 300 may comprise, for example, LM723 I/Cs.

It therefore can be seen that data collection and reduction circuitry 62 of the present invention records and stores for later analysis the velocity signal generated by flow meter 58 of testing system 10. The data collection circuitry 180 functions to convert the DC output signal of flow meter 58 to an AC signal for recordation by recorder 182. The output of recorder 182 is supplied to reduction circuitry 250 for application to a strip recorder for analysis of the lock-up rates of the snubber under test.

While only one embodiment of the invention has been described in detail herein and shown in the accompanying drawings, it will be evident that various further modifications are possible without departing from the scope of the invention.

What is claimed is:
1. A data collection system for use with a portable test system having a recorder and a flow meter including a velocity transducer for generating a DC voltage signal corresponding to the velocity of fluid flowing through the flow meter comprising:
  amplifier means interconnected to the velocity transducer for amplifying the DC voltage signal generated by the velocity transducer in response to fluid flowing through the flow meter and for generating an amplified DC voltage signal;
  a voltage controlled oscillator having a center operating frequency for generating a reference signal;

first circuit means for selectively determining the center operating frequency of said voltage controlled oscillator;

second circuit means for receiving said amplified DC voltage signal and said reference signal for converting said amplified DC voltage signal to an AC voltage signal for application to the recorder for recordation of the velocity of the fluid flowing through the flow meter of the portable test system; and switch means interconnected to said amplifier means for selectively determining the amount of said amplified DC voltage signal to be applied to said second circuit means based upon the rate of flow of said fluid flowing through the flow meter.

* * * * *